United States Patent
Iwashita et al.

(10) Patent No.: US 7,542,654 B2
(45) Date of Patent: Jun. 2, 2009

(54) VIDEO PLAYBACK CONTROL APPARATUS, CONTENT PLAYBACK CONTROL APPARATUS, AND METHOD OF SUPPLYING COMMERCIAL INFORMATION

(75) Inventors: Kazuhiro Iwashita, Hamamatsu (JP); Hiroyuki Fujita, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 978 days.

(21) Appl. No.: 10/367,408

(22) Filed: Feb. 14, 2003

(65) Prior Publication Data
US 2003/0170000 A1 Sep. 11, 2003

Related U.S. Application Data

(63) Continuation-in-part of application No. 09/885,839, filed on Jun. 20, 2001, now abandoned.

(51) Int. Cl.
*H04N 7/00* (2006.01)
*H04N 5/91* (2006.01)

(52) U.S. Cl. .......................................... 386/46; 386/92

(58) Field of Classification Search .................. 386/68, 386/46, 92, 124, 123, 1, 95, 83
See application file for complete search history.

(56) References Cited

U.S. PATENT DOCUMENTS 6,901,207 B1 * 5/2005 Watkins ........................ 386/83

2003/0161614 A1 8/2003 Yanagihara et al.

FOREIGN PATENT DOCUMENTS

| EP | 0 814 419 A2 | 12/1997 |
|---|---|---|
| JP | 8305327 | 11/1996 |
| JP | 9305514 | 11/1997 |
| JP | 63-70304 A | 3/1998 |
| JP | 10105452 | 4/1998 |
| JP | 10-124079 A | 5/1998 |
| JP | 10-64198 A | 6/1998 |
| JP | 11046193 | 2/1999 |

(Continued)

OTHER PUBLICATIONS

Office Action: Notice of Reasons for Refusal for Patent Application No. 2004-376734 (Dated Jan. 18, 2008).

(Continued)

*Primary Examiner*—Robert Chevalier
(74) *Attorney, Agent, or Firm*—Pillsbury Winthrop Shaw Pittman LLP

(57) ABSTRACT

A video data on the main part of a movie, which is long-time video data, is supplied from a DVD (2) that is a disc medium. Plural sets of video data on trailers and commercials of a relatively short playing time are supplied from a distribution center (6) via a subscriber telephone line (7) or the like. A video playback control apparatus (1) selects trailers and commercials in accordance with information on the distributor of the movie, the star actor/actress, the genre, etc., and conditions of the day of week, the time zone, etc., in which the movie is to be played back, and prepares a play schedule while combining the selected trailers and commercials. The whole movie including the selected trailers and commercials are played in accordance with the schedule.

16 Claims, 10 Drawing Sheets

FOREIGN PATENT DOCUMENTS

| | | |
|---|---|---|
| JP | 11-161663 A | 6/1999 |
| JP | 11-167391 | 6/1999 |
| JP | 11-098467 | 9/1999 |
| JP | 11341440 | 12/1999 |
| JP | 2000-152215 | 5/2000 |
| JP | 2001-135023 | 5/2001 |
| JP | 2005/143128 | 6/2005 |
| JP | 2005/176393 | 6/2005 |

OTHER PUBLICATIONS

Office Action: Notice of Reasons for Refusal for Patent Application No. 2004-376735 (Dated Jan. 18, 2008).

* cited by examiner

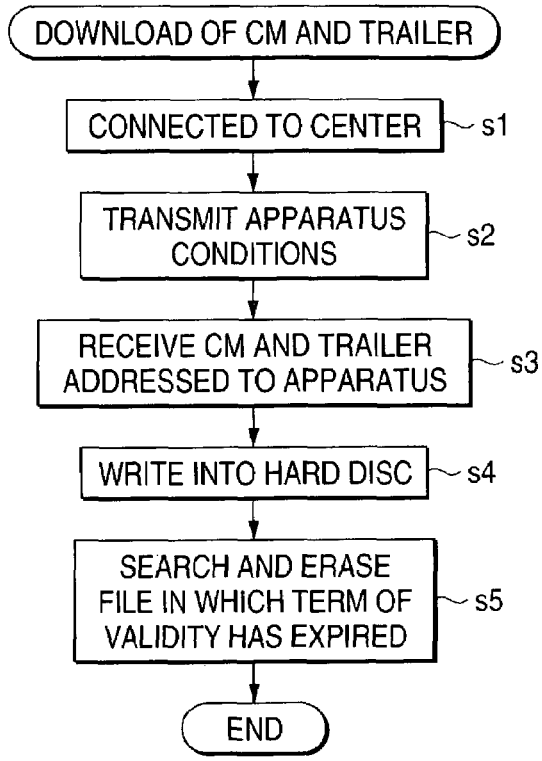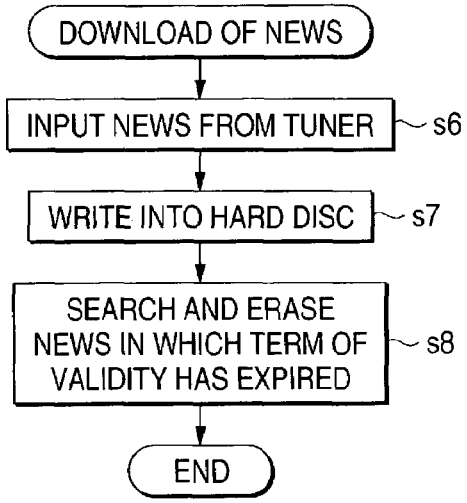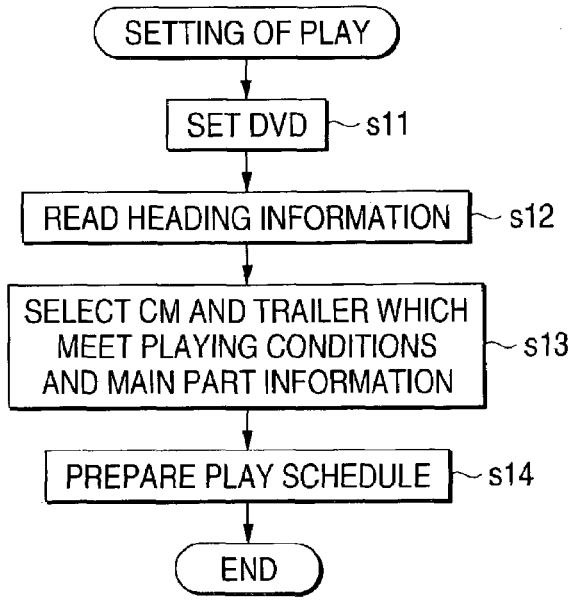

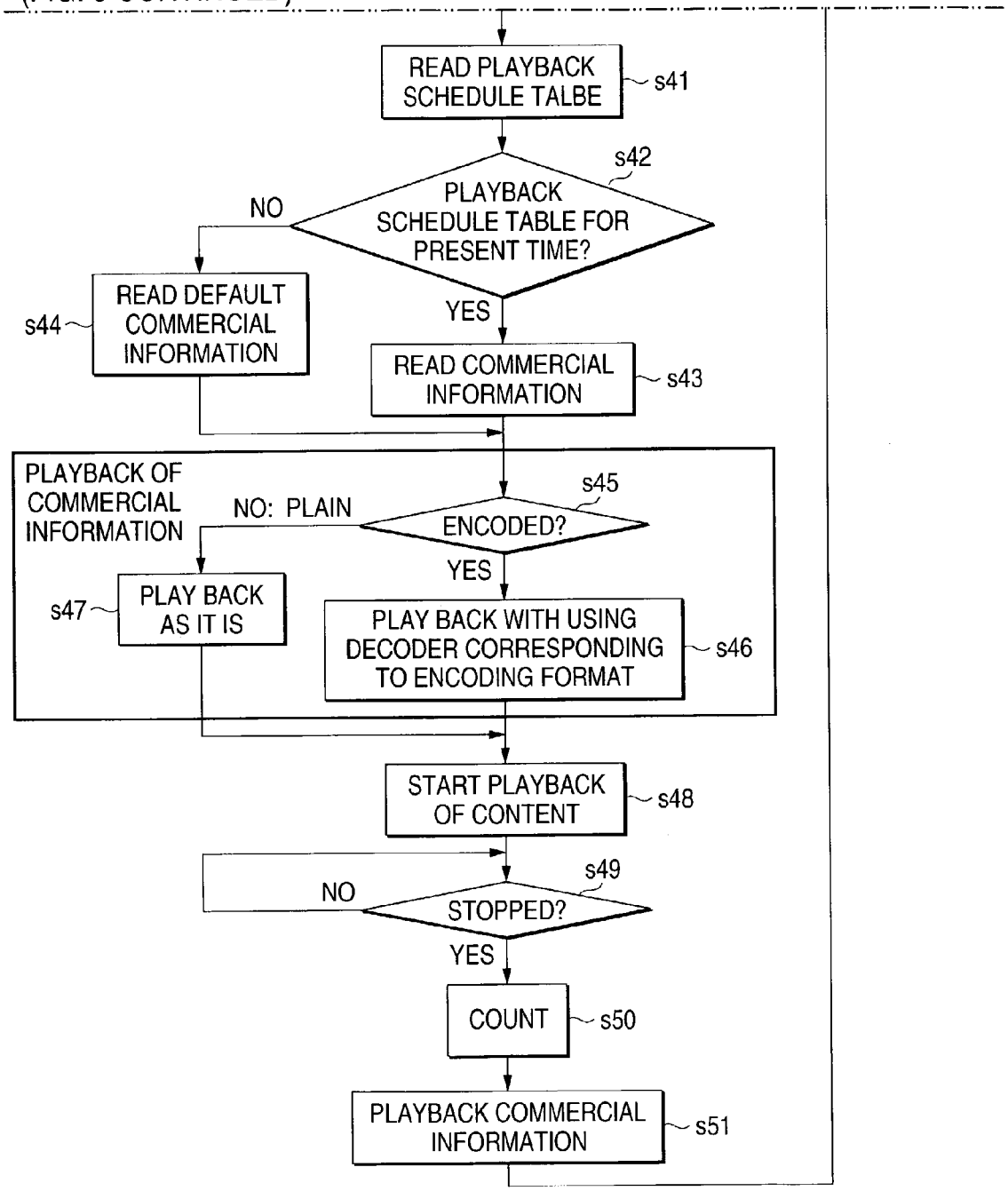

VIDEO PLAYBACK CONTROL APPARATUS, CONTENT PLAYBACK CONTROL APPARATUS, AND METHOD OF SUPPLYING COMMERCIAL INFORMATION

CROSS-REFERENCE TO RELATED APPLICATION

This application is a continuation-in-part of U.S. patent application Ser. No. 09/885,839, filed Jun. 20, 2001 now abandoned.

BACKGROUND OF THE INVENTION

The present invention relates to a video playback control apparatus and a content playback control apparatus which are to be used for playing back video data in a digital theater, a home video player, a home video game machine, or the like, and also to a method of supplying commercial information in which commercial information is provided to such an apparatus.

In a movie theater, trailers etc. are played prior to the main part of a movie, and then the main part is played. Such trailers and the main part are previously combinedly edited so as to be continuously played, and distributed in the form of a roll film made of a resin. Therefore, it is impossible to easily reedit trailers and the main part in accordance with conditions of the location, the time zone, etc.

At present, in playing of a movie, distribution of a movie in which digital video data are used is being put to practical use. The most real-time system of distributing video data is the on-line distribution via a telephone line or a CS (Communication Satellite). However, on-line distribution of a large amount of video data such as a movie requires a very long time period, and a high communication cost. Therefore, this system is not rational. A video data distribution system using disc media such as DVDs can be surely performed and does not entail high cost, but has a problem in that the system is poor in real-timeness and flexibility in, for example, selection of trailers in accordance with conditions such as the location and the time zone.

It has been proposed that a commercial is included in a content to be played back in a home video player or a home video game machine and the price of a package medium such as a video disc or a game cassette is lowered by the advertisement rate paid by the sponsor of the commercial.

When commercial data are embedded into a package medium, however, the same commercial is always played back, thereby causing a problem in that the content becomes obsolete as a result of elapse of time. Unlike television broadcasting, it is difficult to change a commercial to be played back, in accordance with conditions such as the day of the week and the time zone.

SUMMARY OF THE INVENTION

It is an object of the invention to provide a video playback control apparatus which is supplied with a large amount of video data via a medium such as a disc, and with a small amount of replaceable video data via communication, and which plays back both the video data while combining the video data with each other.

It is another object of the invention to provide a video playback control apparatus, a content playback control apparatus, and a method of supplying commercial information in which, when a package medium for home use is played back, a commercial that corresponds to the day of week and the time zone, and that is free from obsolescence can be played back.

To achieve the above object, according to a first aspect of the present invention, there is provided a video playback control apparatus which continuously plays back first video data supplied from a medium and second video data supplied from a communication system, while combining the first and second video data with each other.

Further, based on the first aspect of the present invention, there can be provided a video playback control method which comprises: reading first video data recorded on a medium; receiving second video data from a communication system; and continuously playing back the first video data and the second video data while combining the first and second video data with each other.

According to a second aspect of the present invention, in the first aspect of the present invention, the first video data may be video data on a main part of a movie, and the second video data may be video data on at least one of a trailer and an advertisement.

According to a third aspect of the present invention, in the second aspect of the present invention, the trailer and the advertisement are to be played prior to the main part of the movie.

According to a fourth aspect of the present invention, in the first or second aspect of the present invention, plural sets of the second video data may be supplied from the communication system, and in this case, at least one of the sets of the second video data, and the first video data are continuously played back while being combined with each other.

According to a fifth aspect of the present invention, in the fourth aspect of the present invention, the at least one of the sets of the second video data, which is combined with the first video data, may be selected on the basis of at least one of conditions of a manufacturer of the video playback control apparatus and an installation site, conditions of a time and day of week in which the first video data is to be played back, and information on a kind of the first video data.

Further, based on the fifth aspect of the present invention, the video playback control method may further comprise selecting at least one set from the sets of the second video data, which is combined with the first video data, on the basis of at least one of conditions of a manufacturer of the video playback control apparatus and an installation site, conditions of a time and day of week in which the first video data is to be played back, and information on a kind of the first video data.

Furthermore, according to a sixth aspect of the present invention, in view of a preferred embodiment which will be described later, for example, there may be provided a video playback control apparatus which comprises: a medium reading section which outputs first video data recorded on a medium; a communication control section which receives second video data via a communication device from a separate distribution center that is disposed independently of the video playback control apparatus; and a control section, to which the medium playback section and the communication control section are connected, and which controls the first video data and the second video data so that the first video data and the second video data are continuously played back while being combined with each other. However, it should be noted that the present invention is not limited to the aforementioned example.

In the present invention, the first video data may be supplied by a storage medium such as a DVD etc. For example, the first video data is long-time video data on the main part of a movie etc. The second video data is supplied through communication. The communication may be performed by any kind of communication system, for example, a telephone line, a communication satellite (CS), etc. The second video data which is to be received through the communication may be, for example, video data of a relatively short playing time, on a trailer of a movie, a commercial, etc. When the first and second video data are combined with each other, video playback is enabled in a free combination of long-time video data and replaceable video data.

In the case of a movie, trailers, and the main part of the movie have been previously combinedly edited as discussed in the related art. In contrast, according to the present invention, such trailers can be freely combined with the main part, and hence an optimum trailer can be used in combination in accordance with various conditions of the title of the movie, the day of week, etc.

According to a seventh aspect of the invention, a content playback control apparatus comprises: a content playing back section which plays back a content such as a video, a sound, or a game; and a commercial playing back section which plays back commercial information, and, when a content is played back by the content playing back section, the commercial playing back section plays back commercial information in combination with the content.

According to an eighth aspect of the invention, in the seventh aspect of the invention, the content is supplied by means of a package medium, and the commercial information is supplied by means of communication.

According to a ninth aspect of the invention, in the seventh or eighth aspect of the invention, the content is identified by a content ID, and the commercial playing back section selects and plays back commercial information corresponding to the content, on the basis of the content ID.

According to a tenth aspect of the invention, in the seventh to ninth aspects of the invention, a commercial schedule table in which plural sets of commercial information and date and time of playing back each set of the commercial information are described is supplied to the apparatus, and the commercial playing back section refers to the commercial schedule table, and plays back commercial information corresponding to a current date and time.

In the invention, commercial information is played back in accordance with playback of a content, for example, a video such as a movie, a sound such as music, or a game. For example, such a content is supplied by means of a package medium. The means for supplying a content is not restricted to a package medium as far as a content of a large capacity can be supplied. The commercial information is supplied by means of, for example, communication. The supplying means is not restricted to communication as far as new information can be always supplied. The communication may be performed by any kind of communication system such as a telephone line or a communication satellite (CS). Commercial information which is supplied through communication can be easily updated, and hence supply of commercial that is free from obsolescence is enabled. When commercial information is changed in accordance with a content ID or the date and time (the date, the time zone, and the like), commercial information complying with the content or the viewer class can be played back. Commercial information may be played back before and after playback of a content, or with interrupting playback of a content. Alternatively, commercial information may be superimposedly played back during playback of a content (for example, in the form of a telop or a small window screen).

According to an eleventh aspect of the invention, in a method of supplying commercial information in which commercial information that is provided to a content such as a video, a sound, or a game is supplied by means of a computer system, a server apparatus stores the commercial information, and when a content is played back by a content playback control apparatus serving as a user apparatus, the content playback control apparatus downloads commercial information which is provided to the content, from the server apparatus, and plays back the commercial information in combination with the content.

According to a twelfth aspect of the invention, in the eleventh aspect of the invention, the server apparatus stores a commercial schedule table in which plural sets of commercial information and date and time of playing back each set of the commercial information are described, and when a content is played back, the content playback control apparatus downloads plural sets of commercial information which are provided to the content, and the commercial schedule table, and plays back commercial information which is selected by retrieving the commercial schedule table by the current data and time, in combination with the content.

According to a thirteenth aspect of the invention, in the eleventh or twelfth aspect of the invention, the commercial information is uploaded from a terminal apparatus of a commercial provider to the server apparatus.

In the invention, there is a sponsor (an advertiser or a commercial provider) for a content, for example, a video such as a movie, a sound such as music, or a game. When the content is played back, also commercial information of the sponsor is played back in combination with the content. Commercial information may be played back before and after playback of a content, or with interrupting playback of a content. Alternatively, commercial information may be superimposedly played back during playback of a content (for example, in the form of a telop or a small window screen). When a sponsor is set for a content and commercial information of the sponsor is played back in combination with the content, it is possible to obtain an advertisement rate. Therefore, the prices of the content and the content playback control apparatus can be reduced.

A content may be supplied by means of a package medium or online. Usually, a content is configured by a literary work and its substance is unchanged. By contrast, commercial information is frequently updated in order to always supply latest information. Therefore, commercial information is stored in the server apparatus, and, when a content is to be played back, commercial information is downloaded. A sponsor can easily update and maintain commercial information in the server apparatus. Therefore, latest commercial information can be always provided to a person who plays back a content.

Alternatively, plural sets of commercial information may be prepared, and one of the commercial information sets may be played back in accordance with a schedule. According to the configuration, a plurality of sponsors can be set for one content, or even the same sponsor can provide different commercials depending on the date and time.

BRIEF DESCRIPTION OF THE DRAWINGS

FIG. 2 is a flowchart showing the operation of the video playback control apparatus.

DETAILED DESCRIPTION OF PREFERRED EMBODIMENTS

First Embodiment

Figure 1:
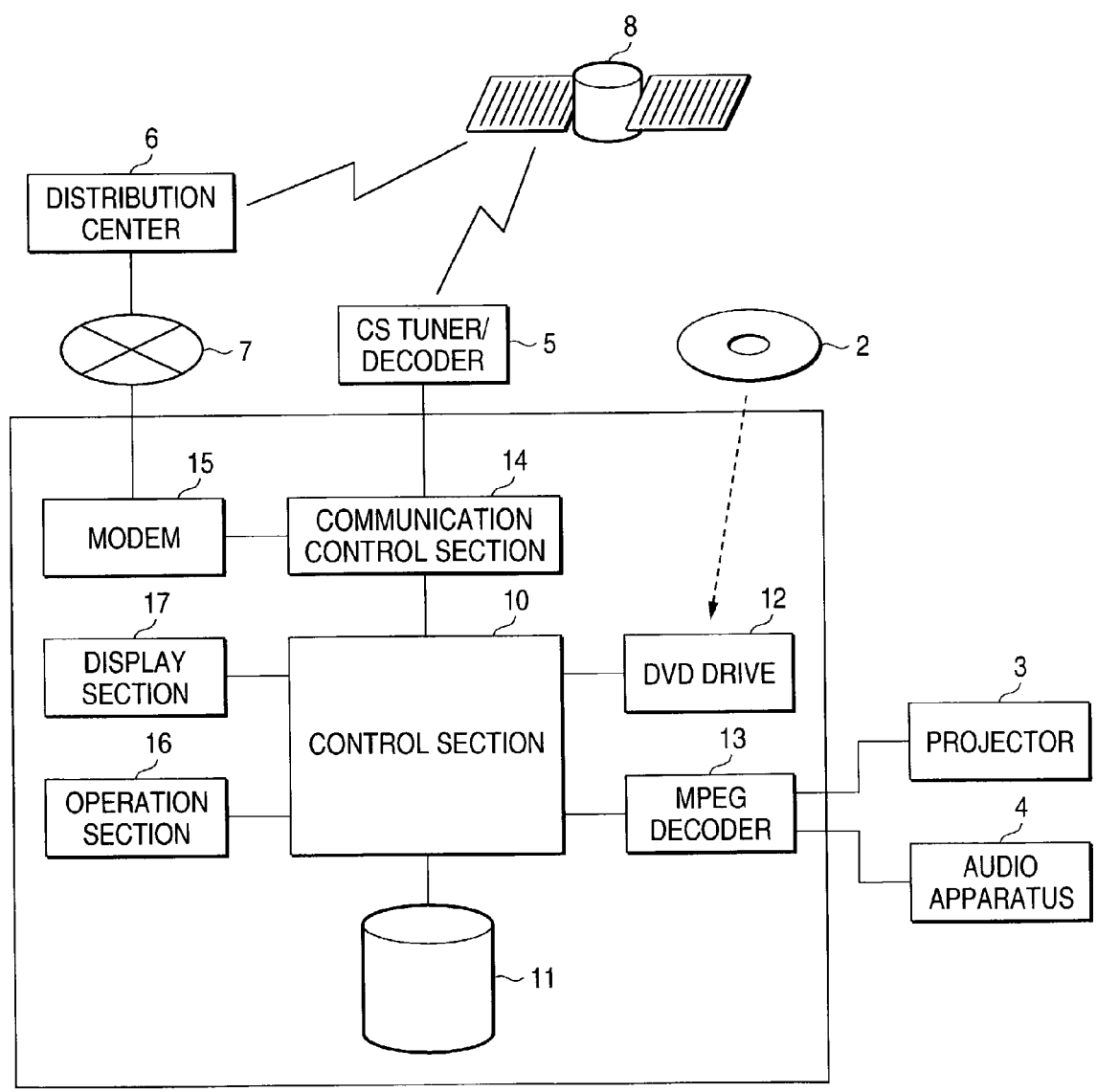
FIG. 1 is a block diagram of a digital theater system including a video playback control apparatus which is a first embodiment of the invention.

FIG. 1 is a block diagram of a digital theater system including a video playback control apparatus according to a first embodiment of the present invention. The digital theater system includes: a video playback control apparatus 1 which comprises a DVD drive 12, and which can sequentially read out video data on main parts of movies, trailers, etc., and output the data as a video signal and an audio signal; a projector 3 which projects the video signal output from the video playback control apparatus 1, onto a screen; and an audio apparatus 4 which amplifies the audio signal output from the video playback control apparatus 1, and outputs the amplified signal as a sound. A DVD 2 on which the main part of a movie to be played is recorded is set into the DVD drive 12 of the video playback control apparatus 1.

The video playback control apparatus 1 has a control section 10 which controls the operation of the apparatus. To the control section 10, connected are a mass storage unit 11 which stores video data on trailers and commercials, the DVD drive 12, an MPEG decoder 13 which decodes MPEG data of a DVD or the like into video and audio signals, a communication control section 14 which is used for downloading the video data on trailers and commercials, an operation section 16 which is to be operated by the user or the operator of the apparatus, and a display section 17. The mass storage unit 11 may be configured by any kind of storage unit as far as it is a readable/writable one and can store video data for several hours. Usually, a hard disc drive may be appropriately used as the mass storage unit.

A modem 15 and a CS tuner/decoder 5 are connected to the communication control section 14. The modem 15 is a card which is incorporated into the video playback control apparatus 1, and the CS tuner/decoder 5 is an external device. The modem 15 is connected to a distribution center 6 via a subscriber telephone line 7. The CS tuner/decoder 5 receives distributed data from the distribution center 6 via a communication satellite (CS) 8. The communication device for communicating with the distribution center 6 is not restricted to the modem and the analog line. For example, a TA (Terminal Adaptor), a DSU (Digital Service Unit), and an ISDN line may be used as the communication device.

The video playback control apparatus 1 receives video data on a trailer via the modem 15, and writes the data into the mass storage unit 11. The distribution center 6 periodically calls each of digital theater systems, and distributes the latest trailers and commercials to the digital theater systems. At this time, the video playback control apparatus 1 transmits apparatus conditions under which distributed commercials and trailers are selected, to the distribution center 6, and the distribution center 6 distributes only video data on commercials and trailers which satisfy the conditions, to the video playback control apparatus 1. The apparatus conditions include the manufacturer of the video playback control apparatus 1, the installation site (the prefecture etc.), and business use/home use. Based on the conditions, the distribution center selects appropriate commercials and trials, and downloads the selected video data to the video playback control apparatus 1. According to this configuration, commercials and trials which have a relatively large amount of data can be selectively downloaded, thereby saving the traffic. Into each of the video data, information indicative of the kind and the term of validity is written. In the case of video data on a commercial, the information includes the name of the enterprise (enterprise code) of the article (including service), the name of the article, the kind of the article (article code), and the term of validity. In the case of video data on a trailer, the information includes the distributor of the movie, the star actor/actress, the date of releasing the main part (start of a road show), and the term of validity.

The video playback control apparatus 1 receives video data on news via the CS tuner/decoder 5, and writes the data into the mass storage unit 11. Each time when news is made, the distribution center 6 transmits data on the news to all the systems via the CS 8.

When the DVD 2 on which the main part of a movie is recorded is set into the DVD drive 12, the video playback control apparatus 1 prepares a play schedule according to the data on the movie main part etc. which are recorded on the DVD 2. In accordance with the movie main part, news, commercials, and trailers are played prior to the movie main part, and the movie main part is thereafter played. The news, commercials, and trailers which are to be played prior to the movie main part are selected on the basis of playing conditions and information of the main part (commercials and trailers are preselected on the basis of the apparatus conditions, and the selected commercials and trailers are downloaded into the video playback control apparatus 1). The playing conditions include the day of week and the time zone when the movie is to be played (i.e., when the DVD 2 is set). The information of the main part includes the distributor of the movie, the star actor/actress, and the genre of the movie. In accordance with the conditions and information, commercials and trailers are selected. On the basis of the playing conditions, when the time zone is the daytime of a weekday, for example, the schedule is prepared so as to play commercials and trailers which are suitable for housewives and families. On the basis of the information of the main part, the schedule is prepared so as to play trailers of next movies of the same distributor, the same star actor/actress, and the same genre. As described above, downloaded commercials and trailers are preselected according to the apparatus conditions. Based on these conditions and information, therefore, commercials and trailers which are to be played are synthetically selected.

The prepared schedule is written into the mass storage unit 11. When instruction for starting the play of the movie is given, video data on news, commercials, trailers, and the main part are read out in accordance with the schedule, and then played back. The apparatus conditions and the playing conditions are stored in the mass storage unit 11, and the information of the main part is recorded on the DVD 2 on which the movie is recorded.

The downloaded video data on news, commercials, and trailers may be MPEG-2 format data in the same manner as the movie main part of the DVD 2, or may be those of another format. For example, such data of another format are a QUICKTIME movie, text data, still image data, and sequence data in which texts and still images are arranged in time sequence. The control section 10 may develop the data into a video signal and directly output the video signal to the projector 3. In order to maintain continuity of a video signal, alternatively, video data of any format may be reconverted into an MPEG data, and the MPEG data may be supplied to the projector 3 through the MPEG decoder 13.

In the case where the playing time of the movie main part is longer than two hours, the main part is sometimes recorded over two or more DVDs. The DVD drive 12 may be configured by a drive for a single DVD. Alternatively, the DVD drive may be configured by a drive having a DVD changer, so that, even in such a case, the playing operation can be uninterruptedly continued without replacing the DVDs in the course of the playing operation.

Figure 3:
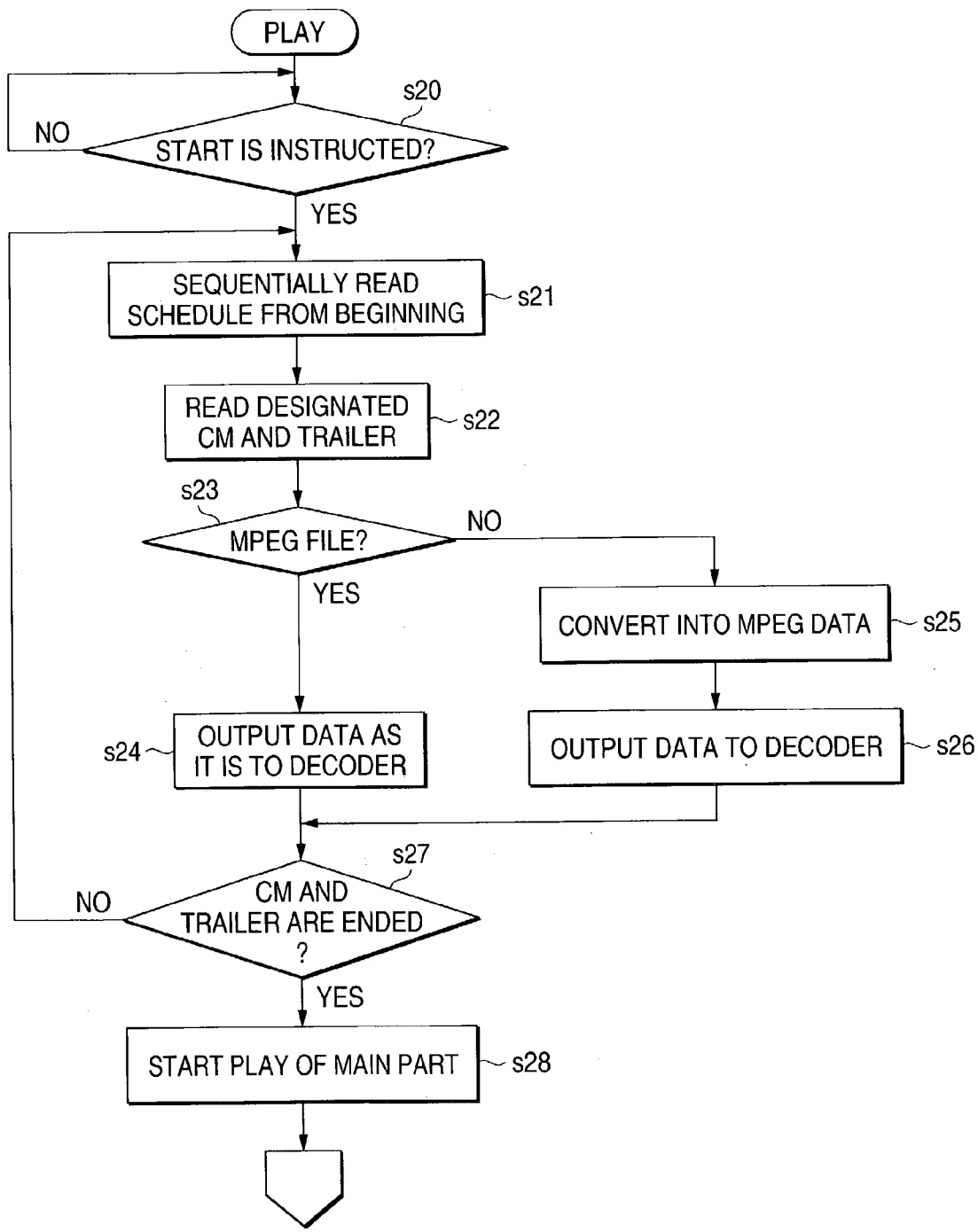
FIG. 3 is a flowchart showing the operation of the video playback control apparatus.

FIGS. 2A to 3 are flowcharts showing the operation of the video playback control apparatus.

FIG. 2A is a flowchart showing the operation of downloading video data on commercials and trailers from the distribution center 6 via the subscriber telephone line. First, the distribution center 6 is connected to the telephone line (s1). This connection of the telephone line may be performed by a procedure in which the distribution center 6 periodically makes a telephone call, or that in which the apparatus makes a telephone call to the distribution center 6. When the distribution center 6 is connected to the telephone line, the apparatus transmits the apparatus conditions to the distribution center 6 (s2). On the basis of the apparatus conditions, the distribution center 6 selects one or more of new commercials and trailers, and transmits the selected commercials and trailers to the apparatus. The apparatus receives the video data on the commercials and trailers which are addressed to the apparatus itself (s3). The received video data on the commercials and trailers are written into a hard disc serving as the mass storage unit 11 (s4). The terms of validity of commercials and trailers which are already stored in the hard disc 11 are checked, and data in which the term has expired is erased (s5).

FIG. 2B is a flowchart showing the operation of downloading news via the communication satellite 8. News are distributed at any time via the communication satellite 8, and received by the CS tuner/decoder 5. The CS tuner/decoder 5 supplies the received news to the video playback control apparatus 1, e.g., the communication control section 14 in this embodiment (s6). The video playback control apparatus 1 writes the news into the hard disc 11 (s7), searches news in which the term has expired, and erases such news (s8). Usually, data on news is configured by text data (and still image data), and the title, the genre (current topics, entertainments, sports, etc.), and the term of validity of the news are written into the header of the data.

FIG. 2C is a flowchart showing the operation of setting a play schedule. The play schedule is executed when the DVD 2 on which the main part of a movie is recorded is set into the DVD drive 12. When the DVD 2 is set into the DVD drive 12 (s11), heading information of the DVD 2 is read out (s12), and information on the distributor, the star actor/actress, etc. in the heading information is used as main part information for selecting commercials and trailers. Based on the read out main part information and the play conditions of the day of week and the time zone, etc., news, commercials, and trailers are selected (s13). The play schedule is prepared so as to place the selected news, commercials, and trailers prior to the main part of the movie, and the prepared schedule is stored into the hard disc 11 (s14).

As described above, in the embodiment, the video playback control apparatus 1 prepares a play schedule on the basis of the apparatus conditions, the play conditions, and the main part information. However, the conditions and information for preparing a play schedule are not restricted to those described above. Alternatively, a predetermined play schedule may be downloaded from the distribution center 6.

FIG. 3 is a flowchart showing the playing operation of the video playback control apparatus 1. When the operation of setting a play schedule shown in FIG. 2C is completed, the apparatus waits for input of the start instruction by the user (or the operator) (s20). When the start instruction is given, the play schedule which is stored in the hard disc 11 is sequentially read out with starting from the beginning (s21), and video data on the designated one of news, commercials, and trailers is read out (s22). If the read out video data is of a file of the same MPEG format as the movie main part (s23), the video data is supplied as it is to the MPEG decoder 13 (s24). If the read out video data is not of an MPEG format file (s23), the video data is developed into images to be reconverted into data of the MPEG format (s25), and the MPEG data is supplied to the MPEG decoder 13 (s26). This operation is performed on all of the news, commercials, and trailers which are written in the play schedule (s27). Thereafter, the DVD drive 12 is activated to start the play of the movie main part (s28).

In the embodiment, news, commercials, and trailers are played by using the MPEG decoder 13, the projector 3, the screen (not shown), and the like which are hardwares for playing the movie main part. Alternatively, hardwares for commercials may be disposed in addition to the hardwares for the movie main part, and commercials and news may be played in parallel with the movie main part. Subtitles of a movie may be edited as sequence data for sequentially displaying text data of the same format as a word track of karaoke music data, and displayed in parallel with the movie main part. In this case, subtitles are not printed into the main part of a movie, and hence it is possible to display subtitles of any language as required (or not to display subtitles).

A sales method may be employed in which the apparatus is set so that, in accordance with the manufacturer of the apparatus (the video playback control apparatus 1) contained in the apparatus conditions, a commercial of the manufacturer is downloaded, and the commercial is always played, whereby the price of the apparatus is reduced.

Second Embodiment

A second embodiment of the invention will be described with reference to FIGS. 4 to 9. In the following description of the embodiment, a content playback control apparatus for home use (such as a video player, an audio player, or a video game machine) which is connected to a network, a server apparatus which distributes commercial information to the content playback control apparatuses, and the like will be described. In this system, when a content of an AV medium serving as a package medium on which a movie, music, a game, or the like is recorded is to be played back, commercial information of a sponsor is played back before and after, or in the middle of the playback of the content. The prices of the AV medium and the content playback control apparatus are shared by the advertisement rate. As a result, the prices of the AV medium and the content playback control apparatus can be lowered.

Figure 4:
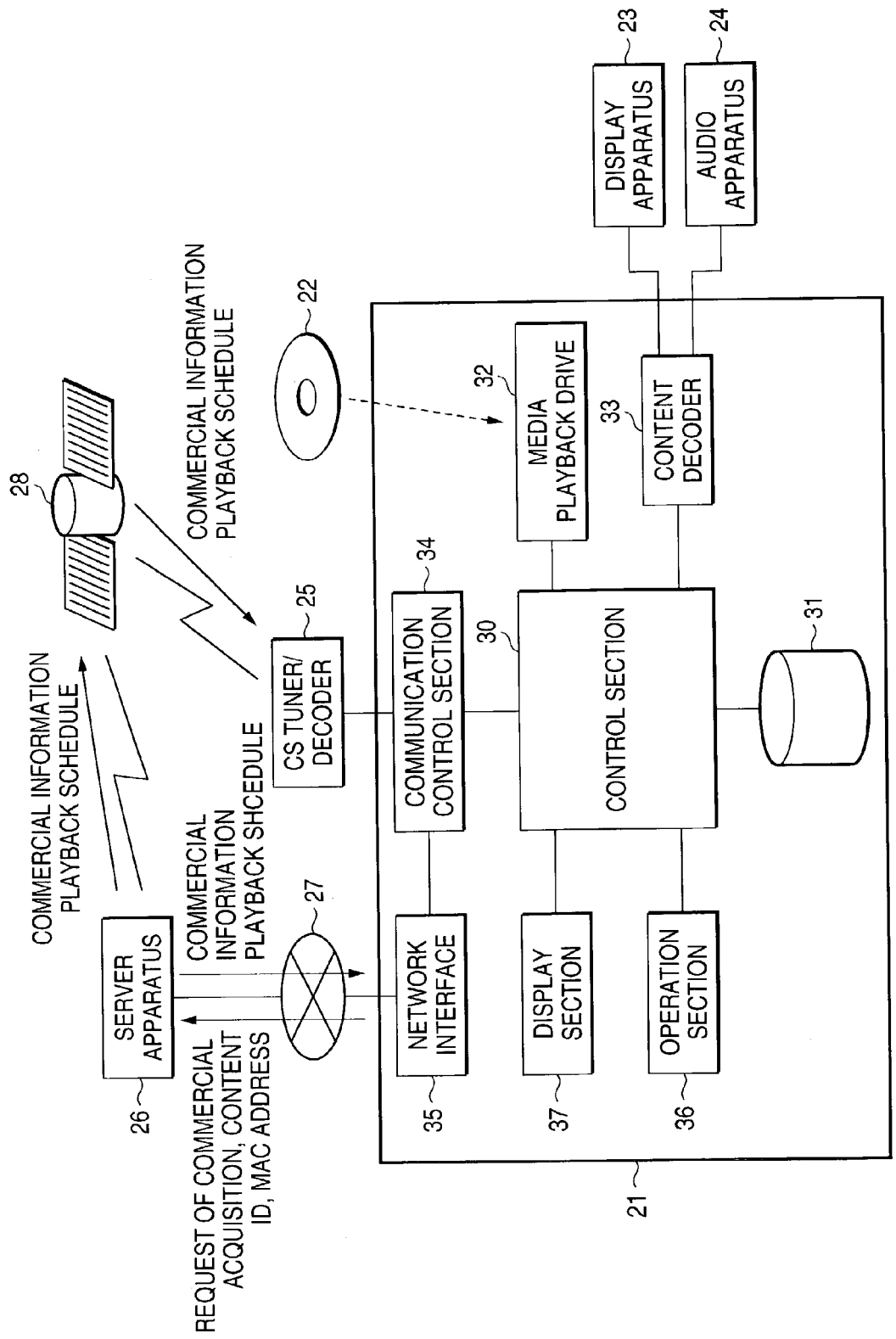
FIG. 4 is a block diagram of a digital theater system including a content playback control apparatus which is a second embodiment of the invention.

FIG. 4 is a block diagram of a home AV system including the content playback control apparatus according to the second embodiment of the invention. In the home AV system, as described above, the content playback control apparatus 21 functions as a video player, an audio player and a video game machine. The apparatus has a media playback drive 32 that reads an AV medium 22 on which a content such as a movie, music, or a game is recorded. The AV medium may have a form such as a DVD (Digital Video Disc) or a CD (Compact Disc), or may be a package of any other form.

In the embodiment, outputting processes of all kinds of contents and commercial information, including not only playbacks of a movie content, a music content, and commercial information configured by video and audio data, but also execution of a game content, and that of commercial information configured by programs are expressed by the term "playback".

Various kinds of commercial information respectively corresponding to contents are stored (cached) in a mass storage unit 31 which is configured by an HDD or the like. When the content of the AV medium 22 set in the media playback drive 32 is to be played back, commercial information corresponding to the content is read out, and then broadcasted before and after playback of the content. Processing of converting the content and the commercial information into video and audio data is performed by a content decoder 33, a display apparatus 23, and an audio apparatus 24.

The operation of the content playback control apparatus 21 is controlled by a control section 30 configured by a computer. To the control section 30, connected are the mass storage unit 31, the media playback drive 32, the content decoder 33, a communication control section 34, an operation section 36, and a display section 37. The content decoder 33 decodes the content recorded on the AV medium 22, and commercial information into video and audio signals. The communication control section 34 downloads commercial information and a broadcasting schedule table (described later) from a server apparatus 26 via a network interface 35 or a CS tuner/decoder 25. The operation section 36 and the display section 37 are to be operated by the user in order to instruct playback of a content and stop the playback.

The mass storage unit 31 may be configured by any kind of storage unit as far as it is a readable/writable one and can store video data for several hours. Usually, a hard disc drive may be appropriately used as the mass storage unit. In the case where production of an image is conducted by means of rendering as in the case of a game, the content decoder 33 is not necessary, or functions as a graphic board.

The network interface 35 and the CS tuner/decoder 25 are connected to the communication control section 34. The network interface 25 is a card which is incorporated into the content playback control apparatus 21, and the CS tuner/decoder 35 is an external device. The network interface 35 is connected to the server apparatus 26 via a network 27. The network interface 35 may be formed so as to be connected to the network 27 by dial-up as required. Preferably, the network interface may be always connected to the network 27 via a home LAN or the like. The CS tuner/decoder 25 receives commercial information from the server apparatus 26 via a communication satellite (CS) 28. The network interface 35 for communicating with the server apparatus 26 via the network 27 may be configured by a modem, a TA (Terminal Adaptor), or the like.

The content playback control apparatus 21 writes the commercial information and the playback schedule table which are received from the server apparatus 26 via the network interface 35, into the mass storage unit 31. The content playback control apparatus 21 uploads a log of, for example, the number at which each content is played back, and that at which each commercial information is played, to the server apparatus 26 via the network interface 35.

When the AV medium 22 is set in the media playback drive 32, the content playback control apparatus 21 accesses the server apparatus 26 to download commercial information of a sponsor who provides a commercial to the content of the AV medium 22, and a playback schedule table of the commercial information. At this time, the content playback control apparatus 21 transmits apparatus identification information, and a content ID of the content recorded on the set AV medium, to the server apparatus 26.

A content ID is an ID for uniquely identifying a content which can be distributed as electronic data, such as a movie, music, or a game. Information configured by, for example, an ID center management number, a content attribute, a right attribute, a right use attribute, a circulation attribute, a distribution attribute, and a free region, and the ID center management number is used as the ID. The information is written into a header of a content, and also embedded into the content as digital watermark information.

As the apparatus identification information, for example, a MAC (Media Access Control) address which is written into the network interface 35 may be used. A MAC address is a 48-bit identification address which is used in a media access control of a network, and uniquely allocated to all NICs connected to a LAN. When the user who purchased the content playback control apparatus 21 initially accesses the server apparatus 26, the MAC address of the apparatus is registered as the apparatus identification information of the content playback control apparatus of the user.

When the server apparatus 26 receives a content ID and apparatus identification information from the content playback control apparatus 21, the server apparatus downloads to the content playback control apparatus 21, the playback schedule table (see FIG. 5) in which commercial information corresponding to the content and the kind of the content playback control apparatus, and a playback schedule of each sets of commercial information are written. In the content playback control apparatus 21, the commercial information and the playback schedule table which are downloaded are stored into the mass storage unit 31.

Figure 5:
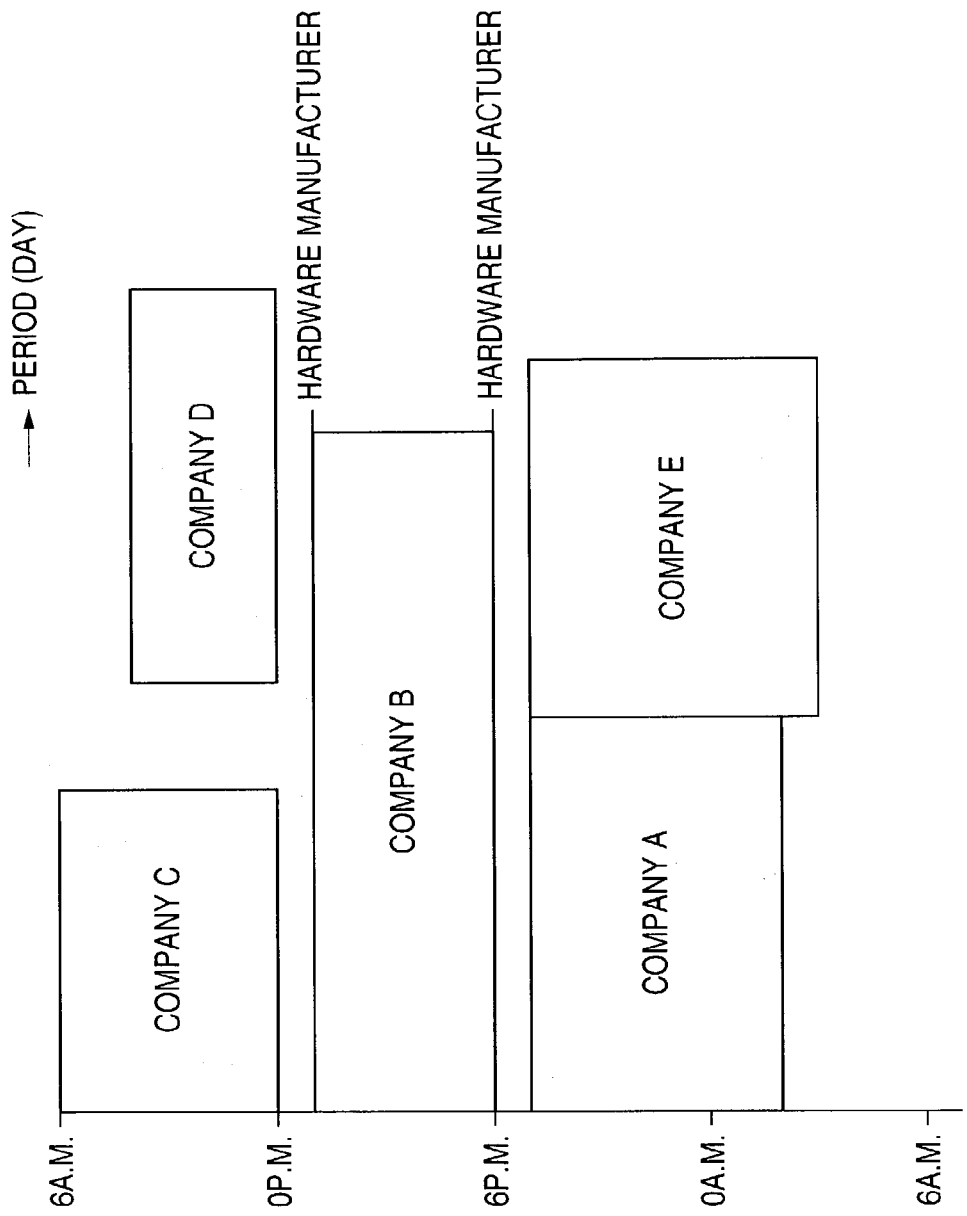
FIG. 5 is a diagram showing an example of a commercial playback schedule table.

FIG. 5 shows an example of the playback schedule table. The playback schedule table is produced for each content by the server apparatus 26, and downloaded together with commercial information to the content playback control apparatus 21 which has transmitted the content ID of the content. In the figure, the abscissa shows the date, and the ordinate shows hours of each day. In the table, the time periods from 12 to 13 hours and 18 to 19 hours in each day are allocated as time frames for commercial of a hardware manufacturer who has produced (sold) the content playback control apparatus 21. The time frame of 6 to 12 hours in 30 days starting from the release date (first day) of a content is allocated to a sponsor C, and that of 13 to 18 hours in 50 days starting from the release date is allocated to a sponsor B. In this way, commercial time frames which have been purchased by sponsors are described in the playback schedule table. Each sponsor has paid the advertisement rate corresponding to the purchased commercial time frame, to a company which manages the server apparatus.

When the AV medium 22 is set in the media playback drive 32, the content playback control apparatus 21 accesses the server apparatus 26 to download the playback schedule table and commercial information of the sponsor. The commercial information and the playback schedule table which are downloaded are cached into the mass storage unit 31. When the same AV medium 22 is again set, the content playback control apparatus accesses the server apparatus 26 to download updated data only. When many media are sequentially set, cached data may be sometimes lost. In this case, data are downloaded in the same manner as the case the medium is initially set. The mass storage unit 31 has an area into which commercial information and a playback schedule table can be cached for plural contents.

In FIG. 5, depending on the date and the time zone, there are time frames in which no sponsor obtains the right of broadcasting commercial. In such time frames, default commercial of the AV medium 22, i.e., a commercial of a sponsor who has the first broadcasting right is broadcast (the first broadcasting right will be described later) Commercial information for a default commercial may be previously written into the AV medium 22, or alternatively may be downloaded as a default commercial from the server apparatus 26.

In the example described above, commercial information and a playback schedule table are downloaded from the server apparatus 26 via the network 27. Alternatively, these data may be downloaded from the communication satellite (CS) 28. The communication satellite 28 sequentially broadcasts playback schedule tables and commercial information for all contents. The CS tuner/decoder 25 decodes only ones of the data which are instructed by the communication control section 34 (only data corresponding to (a content recorded on) the AV medium set in the media playback drive 32), and supplies the decoded data to the communication control section 34.

The commercial information which is downloaded to each of the content playback control apparatuses 21 from the server apparatus 26 may be produced as moving picture data in MPEG format, or may have another format. As the other format, for example, known are a QUICKTIME movie, text data, still image data, and sequence data in which texts and still images are arranged in time sequence. The control section 30 may develop the data into a video signal and directly output the video signal to the display apparatus 23. In order to maintain continuity of a video signal, alternatively, video data of any format may be reconverted into an MPEG data, and the MPEG data may be supplied to the display apparatus 23 through the MPEG decoder 33.

A commercial acquisition flag may be used in a header of a content. Only when a content in which the commercial acquisition flag is set is to be played back, the content playback control apparatus 21 performs the operation of playing back commercial information. A content in which the commercial acquisition flag is not set is judged to be sold without discount or at a regular price and played back without a commercial, and then played back without acquiring and playing back commercial information.

In the case where one AV medium contains plural contents, a commercial acquisition flag may be used for each of the contents, a playback schedule table and commercial information may be disposed for each content in the server apparatus, and it may be judged for each content whether commercial information is to be played back or not.

Figure 6:
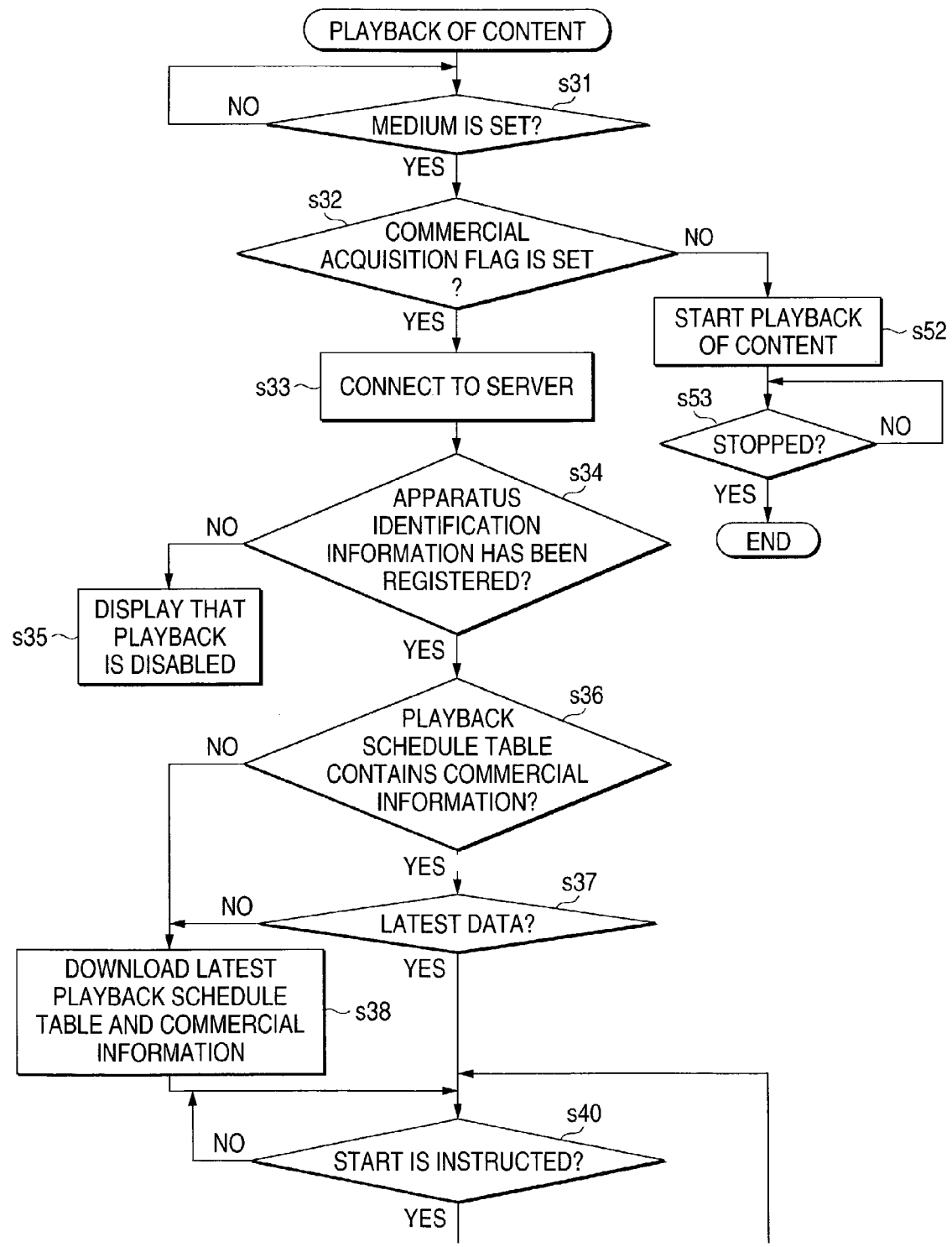
FIG. 6 is a flowchart showing the operation of the content playback control apparatus.

FIG. 6 is a flowchart showing the operation of the content playback control apparatus 21. This operation is conducted when an AV medium on which a movie content is recorded is played back. In s31, first, the apparatus waits for setting of the AV medium 22. When the AV medium is set, it is judged whether the commercial acquisition flag of the medium is set or not (s32). If the commercial acquisition flag is set, the control proceeds to processes subsequent to s33 to play back commercial information. If the commercial acquisition flag is not set, it is judged that the AV medium has been sold at the regular price and does not contain commercial of a sponsor, and the control proceeds to s52. In s52, playback of the content is automatically started (s52), and the control waits under this state until the playback of the content is ended and then automatically stopped, or when the user manually stops the playback (s53).

If the commercial acquisition flag is set, the apparatus accesses the server apparatus 26 to obtain latest commercial information and a playback schedule table, and transmits the apparatus identification information and the content ID to the server apparatus (s33). When the server apparatus receives these data, the server apparatus judges as to whether the apparatus identification information has been registered or not. If the apparatus identification information has not yet been registered, the server apparatus sends a reply indicative of this. When this replay is received, the content playback control apparatus 21 displays a message that apparatus identification information has not yet been registered and playback is disabled (s35).

If the apparatus identification information has been registered, the server apparatus sends as a reply a playback schedule table corresponding the content ID which has been simultaneously transmitted, and a list of commercial information, to the content playback control apparatus 21. The content playback control apparatus 21 compares the list with the playback schedule table and the commercial information which are cached in the mass storage unit 31, to judge as to whether the same data is cached or not (s36, s37). If there is no cache data (s36), latest playback schedule table and commercial information are downloaded from the server apparatus (s38). If there is the cache data but the data is not latest (s37), only the latest data (only old data) is downloaded (s38). Thereafter, the control proceeds to s40 and waits for instructions for starting playback.

If instructions for starting playback is given in s40, the playback schedule table is read out from the mass storage unit 31 (s41), and the table is searched by the current date and time (s42). If the current date and time are in a commercial time frame of any one of sponsors, commercial information of the sponsor is read out from the mass storage unit 31 (s43), and the commercial information is played back (s45 to s47). If the current date and time are not in a commercial time frame of any one of sponsors, default commercial information is read out and then played back (s44 to s47). The default commercial information is information recorded on the set AV medium, or that which is downloaded from the server apparatus as default commercial information. Commercial information is played back in the following manner. In the case where the commercial information has been encoded, the information is decoded by using a decoder corresponding to the encoding format and then played back (s45→s46), and, in the case where the information has not been encoded, the information is played back as it is (s45→s47)

After the commercial information is played back, playback of the content is started (s48), and the control waits under this state until the playback of the content is ended and then stopped, automatically or stopped when the user manually stops the playback (s49). When the playback is stopped, the number at which the content is played back, and that at which each commercial information is played back are incremented (s50), the commercial information is again played back (s51), and the control returns to s40.

During a period when the same AV medium is set in the media playback drive 32, or when the power remains to be turned on, the above-described operation is continued, and, even after playback is ended, the control waits in s40. When the AV medium is removed away and a new AV medium is set, or when the power source is turned off and thereafter turned on, the operation is reset and then restarted from s31.

Alternatively, the process of communicating with the server apparatus may be performed when instructions for starting playback is given. In the alternative, it is judged in s31 as to whether instructions for starting playback is given or not, therefore the process of s40 is omitted. When the playback is ended, the control is returned to s31.

In the embodiment, when apparatus identification information has not yet been registered, an advertised content (in which the commercial acquisition flag is set) is not played back. Alternatively, irrespective of whether apparatus identification information is registered or not, playback of all contents may be allowed.

In the above, the operation of playing back a movie content has been exemplarily described. Also a music content and a game content can be played back by a substantially identical process operation. In the case of a music content, commercial information may contain a video data or may be configured only by an audio data.

In the above, the process operation has been described in the case where one content is recorded on one AV medium, or where plural contents are recorded on one AV medium and commercial for the entire medium is played back in accordance with a single playback schedule table. In the case where plural contents are recorded on one AV medium and different playback schedule tables are used respectively for the contents, the above-described processes may be performed each time when one of the contents is played back.

In the flowchart, commercial information is played back once before and after playback of a content. The playback of commercial information may be conducted at any timing. When the AV medium is not played back, commercial information may be played back in a looped manner.

Each time when the user plays back commercial information or a content, the apparatus may be connected to the server apparatus to transmit the operation log of the user to the server apparatus. According to the configuration, data such as those indicative of the time of playback in the playback control apparatus of a certain user, the content ID of the played back medium, and kinds of played back commercials can be recorded in detail. From log data collected in the server apparatus, therefore, the audience rating can be calculated. Alternatively, logs such as records of playback of contents and commercial information may be stored in the apparatus (the mass storage unit 31), and, when the apparatus is connected to the server apparatus 26, the logs may be uploaded.

Since the audience rating can be surveyed, the audience rating can be used in various manners. For example, it is effectively employed in marketing information, or used as reference data for planning of packages. For example, it is possible to analyze hot only the status of sale of an AV medium, but also the number of playing back an AV medium in a home.

In the embodiment, commercial information is downloaded as a file from the server apparatus and then stored in the mass storage unit 31, and, when an AV medium is to be played back, the commercial information is read out and displayed. Alternatively, commercial information which is sent in the unit of packet from the server apparatus may be subjected to streaming playback.

Figure 7:
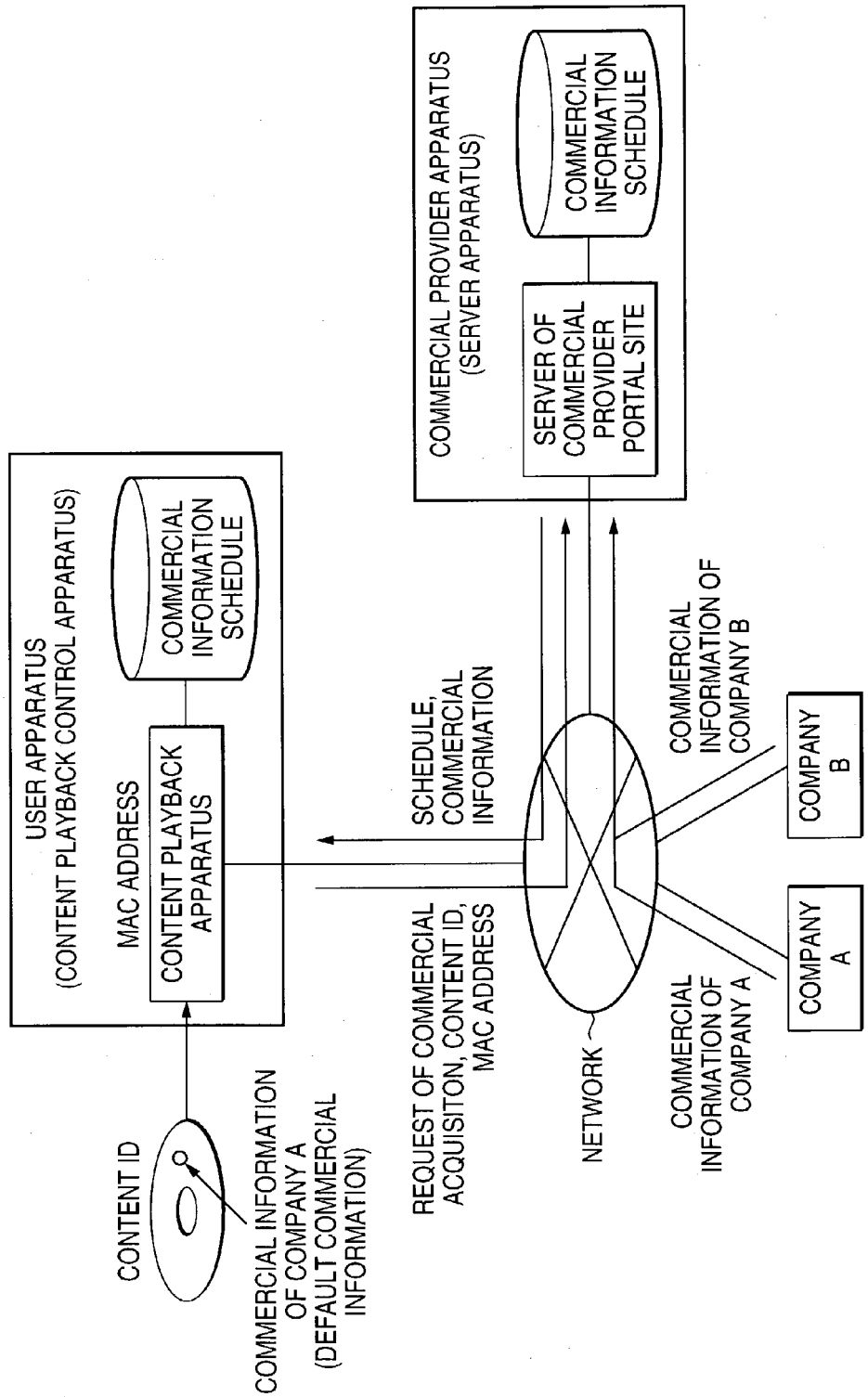
FIG. 7 is a diagram showing a flow of commercial information which is to be played back by the content playback control apparatus.

The flow of commercial information which is to be played back by the content playback control apparatus 21 will be described with reference to FIG. 7. It is assumed that the server apparatus 26 which supplies commercial information to the content playback control apparatus 21 is a sole portal site. The portal site is launched by a commercial management company. When an advertised content is to be released, before a package medium (AV medium) of the content is produced, the right of playing back commercial information (the broadcasting right) is traded for each time frame (the date and the time zone). The income of the broadcasting right is passed along to the user, so that the sale prices of the AV medium and the content playback control apparatus are previously made lower than usual prices (see FIG. 7). When commercial information is collectively managed in the portal site in this way, flexibility in changing commercial contents, alternating a sponsor, and the like can be further enhanced as compared with the system in which data such as commercial information and the URL of a sponsor are previously embedded into an AV medium.

A sponsor uploads commercial information which is to be played back in each home, to the server apparatus 26 (the commercial management company). The commercial information can be freely replaced with other one during a period when the broadcasting right is valid (the commercial broadcasting period). When commercial information is replaced with other one, it possible to provide plural kinds of commercial information during one commercial broadcasting period. Scheduling may be allowed so that commercial information is programmed and several kinds of commercials are sequentially displayed even in the same commercial time frame. The commercial information which is uploaded to the server apparatus 26 is downloaded to the content playback control apparatus 21 and then displayed in accordance with the playback schedule table.

Figure 8:
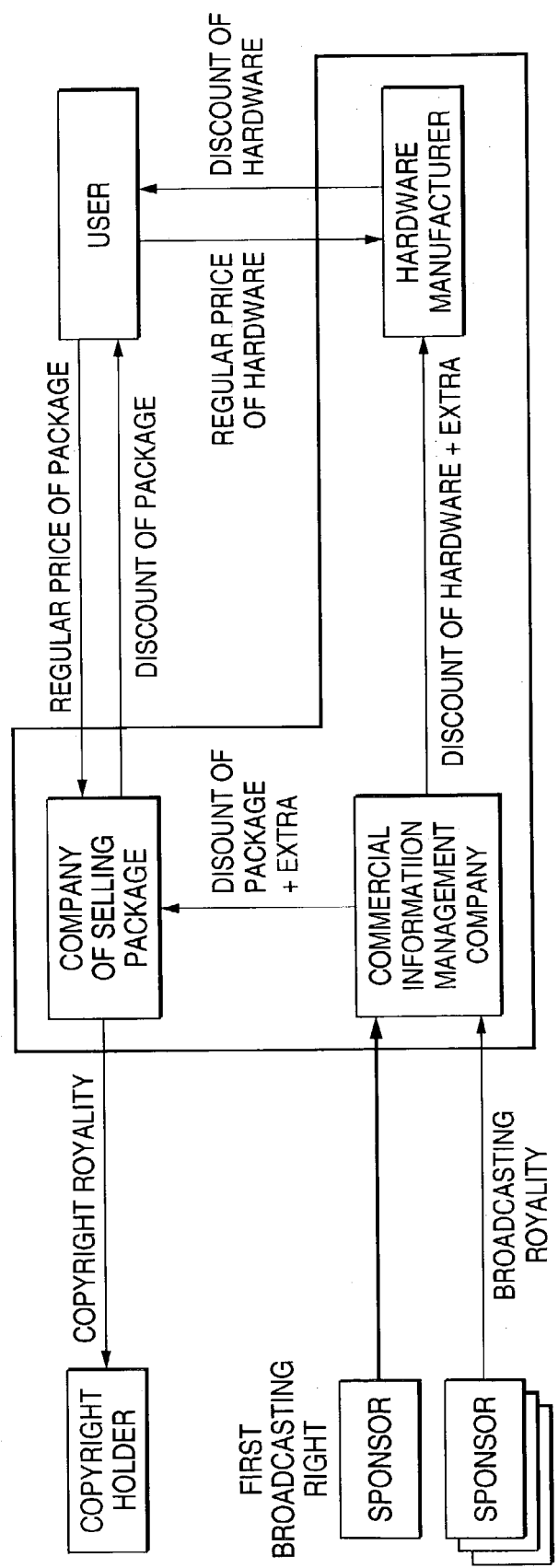
FIG. 8 is a diagram showing a flow of charges of a commercial broadcasting right.
Figure 9:
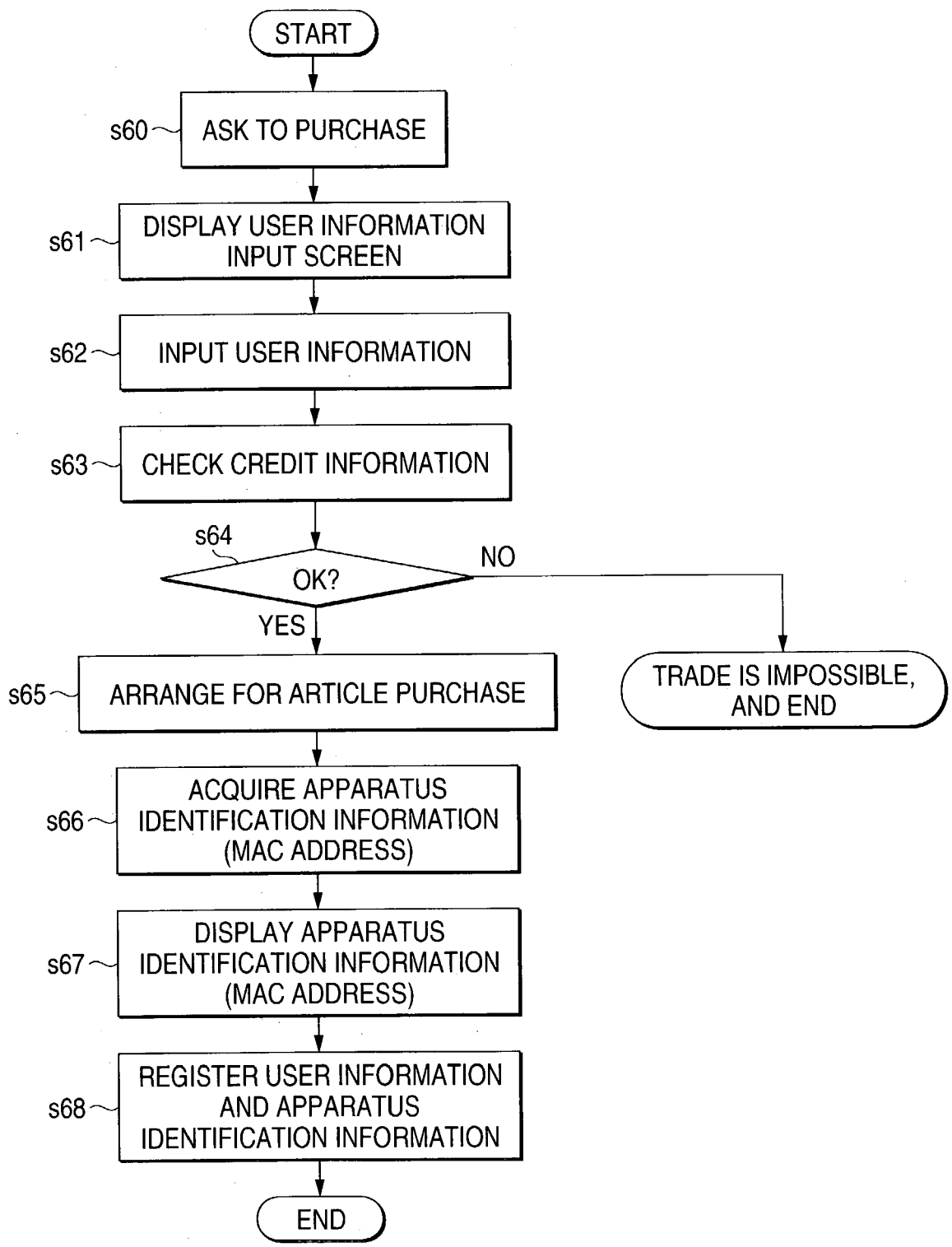
FIG. 9 is a flowchart showing the operation of the content playback control apparatus.

FIG. 8 shows the flow of money in the system. The content playback control apparatus 21 which is set so as to play back commercial information before and after playback of a content is placed in a home or the like, and commercial information and the playback schedule table are downloaded online to the apparatus. As a result, sponsors pay the advertisement rate corresponding to the time frame, to the commercial management company. The advertisement rate is divided to the company, a company of selling a package medium, and a hardware manufacturer who has produced the content playback control apparatus 21. The company of selling a package medium sells an AV medium at a price which is lowered by the divided rate, and the hardware manufacturer sells the content playback control apparatus 21 at a price which is lowered by the divided rate.

Basically, a right of broadcasting commercial is traded for each time frame. A right of broadcasting commercial having priority, or the so-called first broadcasting right is set to only one sponsor. The first broadcasting right is a right of allowing the sponsor having this right to play back its own commercial information in the time frame ensured by the sponsor, and also in a free time frame(s) in which the broadcasting right has not been sold to any sponsor. The commercial information is burned as a default commercial into an AV medium. Alternatively, the commercial information is downloaded as a default commercial from the server apparatus 26. Unlike other broadcasting rights which are obtained respectively by purchasing time frames, the first broadcasting right is a right which is permanently effective, and remains to allow the commercial information of the sponsor to be played back even when a long time period has elapsed after the sale of the package and the broadcasting rights of time frames extinct.

The trade of broadcasting rights including the first broadcasting right is performed by, for example, bidding, or by network auction in which the minimum price for planning of package discounting is used as a reference. With respect to a broadcasting right, all ranks other the first rank are dealt as the same rank, and a broadcasting frame is decided by bidding. The company of selling a package medium produces AV media packages in which commercial information of a sponsor who has obtained the first broadcasting right is written and the commercial acquisition flag is set, and sells the packages at a discount price. AV media packages into which commercial information is not embedded may be sold in parallel at a regular price.

As described above, in the case where the apparatus identification information of the content playback control apparatus 21 is not registered in the server apparatus 26, an advertised content is not played back in the content playback control apparatus 21. Hereinafter, the procedure of registering apparatus identification information will be described. When the content playback control apparatus 21 is purchased in the shop, the registration can be conducted by an input process by the clerk in charge. First, the user (intending purchaser) comes into to the shop and asks to purchase a content playback control apparatus. At this time, the user writes user information on a dedicated form or the like. The user information includes the name, the age, the address, a telephone number, etc. The clerk in charge prepares the article (the content playback control apparatus 21), checks the apparatus identification information (MAC address) of the apparatus, and inputs the user information and the MAC address through a terminal apparatus to register the information in the server apparatus. As a result, the content playback control apparatus 21 can play back an advertised content. The server apparatus which accepts registration of the user information and the MAC address may be an apparatus other than the server apparatus that distributes the commercial information and the playback schedule table. It is requested only that it is judged in s33 and s34 of FIG. 6 as to whether the MAC address has been registered or not and the server apparatus for distribution can conduct the corresponding process.

In the above, the case where the user purchases the content playback control apparatus 21 in the shop has been described. The procedure in the case where the apparatus is purchased online via a network such as the Internet will be described with reference to the flowchart of FIG. 9.

The user (intending purchaser) accesses a server apparatus from a terminal apparatus such as a personal computer to ask to purchase a content playback control apparatus (s60). The server apparatus may be different from the server apparatus 26 shown in FIG. 4. In response to this, the server apparatus transmits a user information input screen, and the terminal apparatus displays the user information input screen (s61). The user information includes the name, the age, the address, a telephone number, and a credit card number. The user inputs the user information through the input screen, and then transmits the information (s62). The server apparatus checks the credit card number to judge as to whether the trade is possible or not. If the trade is possible, the server apparatus transmits an OK message, and, if the trade is not possible, the server apparatus transmits a message indicative of this (s63). The terminal apparatus receives the message, and if the message shows OK, the registration operation is continued, and, if the message indicates that the trade is not possible, the message is displayed and the operation is ended (s64).

If a credit card trade is possible, the server apparatus transmits the user information to a computer of the company of selling a content playback control apparatus to arrange online for article purchase (s65). At the same time, the server apparatus receives the apparatus identification information (MAC address) of the arranged article, from the computer of the sales company (s66). The server apparatus transmits the apparatus identification information to the terminal apparatus. The terminal apparatus displays the apparatus identification information, and ends the purchase request (s67). At the same time, the server apparatus registers the user information and the apparatus identification information, thereby completing the registration process (s68).

In process described above, the registration process is completed online. Alternatively, the online registration may be treated as provisional registration, and, after the article is delivered to the user, the registration may be set as regular registration.

When the user is registered in purchase of an apparatus in this way, the followings are enabled. In the case of a audience rating survey or the like, cross tabulation in which survey results are classified in accordance with sex, age group, and the like can be performed. A MAC address may be registered as the apparatus identification information, and the apparatus may be inhibited from operating when the address of the apparatus is not registered, whereby the apparatus is prevented from being illegally purchased.

In the above, the embodiment in which an AV medium on which an advertised content is recorded is played back by a dedicated content playback control apparatus has been described. Alternatively, such an AV medium may be played back also by a usual content playback control apparatus. In the case where such an AV medium is a DVD on which a movie is recorded, for example, images serving as default commercial information are burned in the top and end of the movie serving as a content image, so that commercial is displayed at the start of playback from the top and the end of the movie.

In this case, the frequency of playing back commercial in such a usual playback control apparatus is lower than that in a dedicated apparatus in which commercial information is surely played back irrespective of the starting position of playback. When incentive such as monetary worth corresponding to the number of playbacks of commercial which is uploaded from a dedicated apparatus to the server apparatus is given online or offline, it is possible to eliminate the sense of unfairness.

In the case of a video game machine, commercial information can be freely played back by a game program serving as a content, and hence the necessity of developing a dedicated apparatus in order to play back commercial information is not great. Therefore, it is requested only to design a content so that commercial information is played back by a program conforming to a conventional video game machine.

As described above, according to the invention, long-time video data of the main part of a movie etc., and video data of a trailer etc. which is to be replaced with another one can be played back with being freely combined with each other. Therefore, a movie can be played with being combined with optimum trailers, commercial information, etc., in accordance with various conditions of the genre of the movie, the day of week, etc.

According to the invention, commercial information is played back with being changed in accordance with a content ID or the date and the time zone, so that a plurality of sponsors can be set for one content and a commercial complying with the viewer can be played back. As a result, a commercial supply that is free from obsolescence is enabled.

What is claimed is:

1. A video playback control apparatus which continuously plays back first video data supplied from a medium and second video data supplied from a communication system, while combining the first and second video data with each other, wherein plural sets of the second video data are supplied from the communication system, at least one of the sets of the second video data, and the first video data are continuously played back while being combined with each other, and the at least one of the sets of the second video data, which is combined with the first video data, is selected on the basis of at least one of i) conditions of a manufacturer of the video playback control apparatus and ii) conditions of an installation site of video playback control apparatus, iii) conditions of a time or day of week in which the first video data is to be played back, or iv) information on a kind of the first video data.

2. The video playback control apparatus of claim 1, wherein the first video data is video data on a main part of a movie, and the second video data is video data on at least one of a trailer or an advertisement.

3. The video playback control apparatus of claim 2, wherein the trailer or the advertisement are to be played prior to the main part of the movie.

4. A video playback control apparatus, comprising:
a medium reading section which outputs first video data recorded on a medium;
a communication control section which receives second video data via a communication device from a separate distribution center that is disposed independently of the video playback control apparatus; and
a control section, to which the medium playback section and the communication control section are connected, and which controls the first video data and the second video data so that the first video data and the second video data are continuously played back while being combined with each other, wherein
plural sets of the second video data are supplied from the communication system, at least one of the sets of the second video data, and the first video data are continuously played back while being combined with each other, and
the at least one of the sets of the second video data, which is combined with the first video data, is selected on the basis of at least one of i) conditions of a manufacturer of the video playback control apparatus and ii) conditions of an installation site of video playback control apparatus, iii) conditions of a time or day of week in which the first video data is to be played back, or iv) information on a kind of the first video data.

5. The video playback control apparatus of claim 4, wherein the first video data is video data on a main part of a movie, and the second video data is video data on at least one of a trailer or an advertisement.

6. The video playback control apparatus of claim 5, wherein the trailer or the advertisement are to be played prior to the main part of the movie.

7. A video playback control method, comprising:
reading first video data recorded on a medium;
receiving second video data from a communication system; and
continuously playing back the first video data and the second video data while combining the first and second video data with each other, wherein
plural sets of the second video data are supplied from the communication system, at least one of the sets of the second video data, and the first video data are continuously played back while being combined with each other, and
the at least one of the sets of the second video data, which is combined with the first video data, is selected on the basis of at least one of i) conditions of a manufacturer of the video playback control apparatus and ii) conditions of an installation site of video playback control apparatus, iii) conditions of a time or day of week in which the first video data is to be played back, or iv) information on a kind of the first video data.

8. The video playback control method of claim 7, wherein the first video data is video data on a main part of a movie, and the second video data is video data on at least one of a trailer or an advertisement.

9. The video playback control method of claim 8, wherein the trailer or the advertisement are to be played prior to the main part of the movie.

10. A content playback control apparatus comprising:
a content playing back section which plays back a content including at least one of a video, a sound or a game; and
a commercial playing back section which plays back commercial information, and wherein when the content is played back by the content playing back section, the commercial playing back section plays back the commercial information in combination with the content wherein
plural sets of the commercial information are supplied from the communication system,
at least one of the sets of the commercial information, and the content are continuously played back while being combined with each other, and
the at least one of the sets of the commercial information, which is combined with the first content, is selected on the basis of at least one of i) conditions of a manufacturer of the content playback control apparatus and ii) conditions of an installation site of content playback control apparatus, iii) conditions of a time or day of week in which the content is to be played back, or iv) information on a kind of the content data.

11. The content playback control apparatus according to claim 10, wherein the content is supplied by a package medium, and the commercial information is supplied by communication.

12. The content playback control apparatus according to claim 10, wherein the content is identified by a content ID, and the commercial playing back section selects and plays back the commercial information corresponding to the content on the basis of the content ID.

13. A method of supplying commercial information in which commercial information to be combined with content is supplied by means of a computer system, the method comprising:
storing the commercial information in a server apparatus; and
downloading the commercial information provided to the content from the server apparatus, and playing back the downloaded commercial information in combination with the content when the content is to be played back by a content playback control apparatus serving as a user apparatus, wherein
plural sets of the commercial information are supplied from the communication system,
at least one of the sets of the commercial information, and the content are continuously played back while being combined with each other, and
the at least one of the sets of the commercial information, which is combined with the content, is selected on the basis of at least one of i) conditions of a manufacturer of the content playback control apparatus and ii) conditions of an installation site of content playback control apparatus, iii) conditions of a time or day of week in which the content is to be played back, or iv) information on a kind of the content data.

14. A method of supplying commercial information in which commercial information to be combined with content is supplied by a computer system, the method comprising:

storing the commercial information in a server apparatus; and downloading the commercial information provided to the content from the server apparatus, and playing back the downloaded commercial information in combination with the content when the content is to be played back by a content playback control apparatus serving as a user apparatus, wherein the server apparatus stores plural sets of commercial information and a commercial schedule table in which date and time of playing back each set of the commercial information are described, and when the content is played back, the content playback control apparatus downloads the plural sets of commercial information provided to the content and the commercial schedule table, and plays back commercial information which is selected by retrieving the commercial schedule table by the current date and time, in combination with the content.

15. The method according to claim 13, wherein the commercial information is uploaded from a terminal apparatus of a commercial provider to the server apparatus.

16. The method according to claim 13, wherein the content includes one of a video, a sound or a game.

* * * * *

UNITED STATES PATENT AND TRADEMARK OFFICE
CERTIFICATE OF CORRECTION

PATENT NO.        : 7,542,654 B2  
APPLICATION NO. : 10/367408  
DATED             : June 2, 2009  
INVENTOR(S)       : Kazuhiro Iwashita et al.

Page 1 of 1

It is certified that error appears in the above-identified patent and that said Letters Patent is hereby corrected as shown below:

On title page, add:
   Item (30) Foreign Application Priority Data
         June 22, 2000 (JP).......2000-188161

Signed and Sealed this

Fifteenth Day of September, 2009

David J. Kappos
*Director of the United States Patent and Trademark Office*